US006684485B1

(12) United States Patent
Potocnik et al.

(10) Patent No.: US 6,684,485 B1
(45) Date of Patent: Feb. 3, 2004

(54) METHOD OF PRODUCING A FLAT COMMUTATOR AND A FLAT COMMUTATOR PRODUCED ACCORDING TO SAID METHOD

(75) Inventors: Jose Potocnik, Idrija (SI); Marjan Drmota, Idrija (SI); Ludvik Kumar, Spodnja Idrija (SI); Gerhard Bachauer, Bad Ischl (AT); Herbert Scheutz, Bad Goisern (AT); Johann Hoell, Hallstatt (AT)

(73) Assignee: Kolektor D.O.O., Idrija (SI)

( * ) Notice: Subject to any disclaimer, the term of this patent is extended or adjusted under 35 U.S.C. 154(b) by 0 days.

(21) Appl. No.: 09/980,230

(22) PCT Filed: Mar. 31, 2000

(86) PCT No.: PCT/EP00/04971

§ 371 (c)(1),
(2), (4) Date: Apr. 26, 2002

(87) PCT Pub. No.: WO00/74181

PCT Pub. Date: Dec. 7, 2000

(30) Foreign Application Priority Data

Jun. 2, 1999 (DE) ........................................ 199 25 286

(51) Int. Cl.[7] ........................ H01R 43/06; H01R 39/16; H02K 15/14; H02K 15/02

(52) U.S. Cl. ............................ 29/597; 29/596; 29/598; 310/235

(58) Field of Search .......................... 29/596, 597, 598; 310/233, 235, 237

(56) References Cited

U.S. PATENT DOCUMENTS 3,478,421 A * 11/1969 Preece ......................... 29/597
5,157,299 A * 10/1992 Gerlach ...................... 310/237
5,189,329 A 2/1993 Srrobl
5,996,210 A * 12/1999 Konig ......................... 29/597

FOREIGN PATENT DOCUMENTS

| | | |
|---|---|---|
| DE | 40 28 420 | 3/1992 |
| DE | 41 37 816 C | 12/1992 |
| DE | 41 40 475 | 6/1993 |
| DE | 196 52 840 | 6/1997 |
| WO | WO 97/03486 | 1/1997 |

* cited by examiner

*Primary Examiner*—Carl J. Arbes
*Assistant Examiner*—T. D. Phan
(74) *Attorney, Agent, or Firm*—Katten Muchin Zavis Rosenman

(57) ABSTRACT

A method for producing a flat commutator with a hub body formed from insulating molding compound, a plurality of conductor segments and an equally large number of carbon segments, the hub body being molded onto a conductor blank provided with radial grooves, which grooves are filled with molding compound. Then the composite part of conductor blank and hub body is machined on the end face of the conductor blank turned away from the hub body. An annular carbon disk is adhesively bonded to the machined end face of the composite part, whereby electrically conductive connections to the conductor blank or to the conductor segments produced therefrom are established. Finally the annular carbon disk is subdivided into carbon segments by cuts extending into the molding compound that fills the grooves. The conductor blank is then subdivided into conductor segments.

19 Claims, 11 Drawing Sheets

METHOD OF PRODUCING A FLAT COMMUTATOR AND A FLAT COMMUTATOR PRODUCED ACCORDING TO SAID METHOD

BACKGROUND OF THE INVENTION

The present invention relates to a method for producing a flat commutator with a hub body formed from insulating molding compound, a plurality of conductor segments and an equally large number of carbon segments which form the running surface, comprising the following steps:

The hub body is molded onto a conductor blank provided with radial grooves, whereupon the grooves are filled with molding compound;

the composite part of conductor blank and hub body is then machined by chip-removing tools on the end face of the conductor blank turned away from the hub body, an annular inner fixation ridge being left standing during machining of the end face of the composite pat;

The present invention also relates to a flat commutator produced by this method.

Flat commutators of the most diverse geometries are known and in service. As an example, German Unexamined Specification (DE-OS) 4140475 describes a typical flat commutator.

A typical area of application for flat commutators is as electric motors of fuel pumps (see, for example, German Unexamined Specifications (DE-OS) 19652840 and 197526326). To ensure that the running surface of the commutator will not be attacked by fuel that contains methanol or ethanol, flat commutators with a carbon running surface are widely used for this purpose. The carbon segments thereof are supported on conductor segments of copper, in order that the winding ends of the rotor winding can be brought into contact with the carbon segments without difficulties.

Two fundamentally different procedures are known for the production of flat commutators with a carbon running surface. In one case a carbon ring, which will subsequently be subdivided by separating cuts into carbon segments, can be molded directly onto the conductor blank by sintering of powdered carbon in which the said blank is embedded. In the other case, a prefabricated annular carbon disk is placed on one end face of the conductor blank or of the conductor segments, joined thereto by soldering to achieve an electrically conducting and mechanically robust connection, and subsequently subdivided into the carbon segments by separating cuts, which can also subdivide the conductor blank into the conductor segments if necessary. Both methods are described in, for example, German Unexamined Application (DE-OS) 19652840. Molding of the hub body onto the conductor blank can be accomplished before (see WO 97/03486) or after (see German Unexamined Application (DE-OS) 4028420) the annular carbon disk is soldered onto the conductor blank.

German Patent 4137816 C1 discloses the production of a flat commutator with a carbon running surface, in which a perforated graphite disk is fixed by means of an SMD conductive silver adhesive on a metallic conductor blank which is provided with openings in the region of the subsequent carbon segments. Thereafter the composite part formed in this way is placed in an injection-molding press, where the support member made of insulating material is injection-molded onto it. In the region of the openings of the conductor blank there are formed direct, gap free, inseparable joints between the support member and the graphite disk, in that the material of the support member penetrates into the upper structure of the graphite material. The graphite disk and the conductor blank are then subdivided into the individual carbon segments and conductor segments, for example by abrasive cutting.

A further flat commutator with a carbon running surface, which the carbon segments are bonded to the conductor segments by means of an electronically conductive adhesive, is known from German Utility Model 9211488U1.

A method of the type mentioned in the introduction can be found in the already cited WO 97/03486. The method for producing a flat commutator known from that patent is characterized in that the separating cuts with which the annular carbon disk is subdivided into carbon segments extend into the molding compound of the hub body without cutting through the conductor blank. This is achieved by opening the radial grooves provided on the rear side of the conductor blank, these grooves being broader than the separating cuts and filled with molding compound, before the annular carbon disk is mounted on the composite part of conductor blank and hub body. As a result, the annular carbon disk bears directly against molding compound of the hub body in the region of the opened radial grooves.

In contrast to the situation in the flat commutator made according to German Unexamined Application (DE-OS) 19652840, for example, none of the copper of the conductor segments is exposed in the region of the air gaps separating each two carbon segments in the flat commutator known from WO 97/03486. Similarly, long-term damage to the conductor segments and/or to the solder layer joining them to the copper segments is not ruled out.

In view of this disadvantage, the object underlying the present invention is to provide a method of the class in question that is suitable for producing flat commutators with extremely long useful life.

SUMMARY OF THE INVENTION

This object is achieved according to the present invention in that the annular fixation ridge is produced in such a way that its outside diameter decreases in machining direction, and in that the annular carbon disk is adhesively bonded to the machined end face of the composite part comprising conductor blank and hub body. The adhesive bond between the annular carbon disk and the composite part comprising conductor blank and hub body that is characteristic of the present invention leads in several ways to increased useful life of the inventive flat commutator, compared with such prior an devices. One of the obvious principles of action is that the adhesive bond provided according to the invention does not act merely between the conductor blank, especially the end face thereof, and the corresponding regions of the annular carbon disk as is known for the soldered joint used in the prior art; instead, the adhesive bond also extends to those regions in which the annular carbon disk bears against the molding compound of the hub body. In particular, this is true for the area of contact between the annular carbon disk and a central fixation ridge made of molding compound. An annular pocket suitable for receiving adhesive is formed by the fact that the fixation ridge tapers in the axial direction.

Besides the longer useful life, an advantageous secondary effect resulting from application of the present invention is that the effort associated with production of the flat commutator is less than in application of known methods. The main reason for this is that there is no need for the laborious pretreatment which, in the prior art, must be performed on the annular carbon disk in order to make it amenable to soldering at all. In particular, the annular carbon disk does not have to be metallized, for example by vapor deposition of a thin copper layer.

Finally, the present invention also proves to be advantageous in that, by suitable choice of adhesive, it is possible to reduce the risk which exists in the prior art that, during welding of the winding ends to the conductor segments, the temperature thereof will exceed the softening point of the solder, thus allowing the carbon segments to slip out of position, Especially when, in a first preferred improvement of the inventive method, the radial grooves are already opened during machining of the end face of the composite part, the adhesive bond provided according to the invention and extending over the entire machined end face of the composite part comprising conductor blank and molded body therefore also acts between the annular carbon disk and the molding compound filling the opened radial grooves. Because of the robust mechanical joint—which is not possible during application of the previously used soldering method—between the annular carbon disk and the molding compound filling the grooves, any bursting of the carbon in the region of the transitions to the molding compound while the separating cuts to subdivide the annular carbon disk are being made is prevented particularly effectively in this improvement of the invention. The structure of the carbon segments adjoining the separating cuts remains intact. As a result, erosion at the carbon segments in the region of the separating cuts is not observed, even after prolonged running time, in flat commutators produced in this way, in contrast to the situation in the prior art.

Incidentally, the adhesive bonds that (also) exist between the carbon segments and the molding compound filling the radial grooves prevent aggressive media such as motor fuel containing methanol or ethanol from emerging out of the separating cuts and penetrating into the region of the contact faces that are present between the conductor segments and the carbon segments. In this regard, the same improvement of the present invention also solves, with simple means, a problem that in the prior art has been overcome only by application of laborious pretreatment and soldering techniques, especially using silver.

Although it is particularly preferable to use a thermoplastic plastic powder with melting point above 290° C. as the adhesive (see hereinafter), the most diverse substances can be used as adhesive within the scope of the present invention. Besides a thermoplastic plastic, eligible substances include in particular bituminous-coal and petroleum tars and pitches, natural resins, synthetic resins and thermosetting plastics, produced by polymerization, polyaddition or polycondensation and modified if necessary by natural substances such as plant or animal oils or natural resins, as well as all synthetic resins produced by modification (examples: esterification, saponification) of natural resins.

Blends of the substances cited in the foregoing are also suitable. In a particularly favorable blend, the adhesive is produced on the basis of a mixture of powders of at least one thermoplastic plastic and at least one thermosetting plastic. This proves to be extremely advantageous in the production of the flat commutator, because melting of the adhesive during welding of the terminals is effectively prevented, and so the carbon segments cannot slip out of position.

If the adhesive itself is not electrically conductive or is only poorly electrically conductive, as is the case for many of the eligible substances, the adhesive will be filled with an electrically conductive metallic or nonmetallic filler in the form of powders, chips or fibers. It is particularly preferred to use a corrosion-resistant metal powder, especially silver or silver-coated copper powder with a particle-size range of 40 to 90 $\mu$m. Depending on application, the filler content in the filled adhesive can range between 5 and 95 per cent by mass, preferably between 25 and 50 per cent by mass.

A preferred improvement of the inventive method is characterized in that, during machining of the end face of the composite part, an annular inner fixation ridge, made of molding compound and having an outside diameter which decreases in machining direction, is left standing. The maximum outside diameter of this fixation ridge is preferably larger than the inside diameter of the bore of the annular carbon disk before it is mounted on the composite part, the oversize for commutators of average dimensions being about 0.1 mm. In a particularly preferred design, the outer edge of the end face of the fixation ridge is chamfered at an angle of between 10° and 45°. The fixation ridge specified in the foregoing has an advantageous effect both during production of the flat commutator and also with regard to its useful life. During the production process, the fixation ridge, by virtue of its dimensions, fixes the annular carbon disk placed on the composite part. The adhesive introduced between the facing end faces of the annular carbon disk on the one hand and of the composite part on the other hand is then held in position and prevented from escaping even if it is a dry powdery material. The same is true for the electrically conductive filler in the form of chips or the like that may be provided. In addition, the fixation ridge performs a centering and adjusting function for the annular carbon disk, and so the outside dimensions of the annular carbon disk can already be made to finished size before the disk is joined to the composite part. Furthermore, the oversize of the fixation ridge compared with the diameter of the bore of the annular carbon disk prevents escape of adhesive in the region of the bore of the annular carbon disk while it is being compression-molded onto the composite part. A contributing factor is that the fixation ridge tapers in axial direction, whereby an annular pocket suitable for receiving adhesive is formed. The cross-sectional geometry of the pocket, which in particular can be wedge-shaped, further favors adhesion of the carbon segments of the finished commutator. Finally, the hardened adhesive accumulated in the adhesive pockets has a positive effect in that it prevents aggressive substances from passing radially from the inside into the contact area formed between the carbon segments and the conductor segments.

According to another preferred improvement of the invention, it is provided that the composite part of conductor blank and hub body has an outer annular jacket of molding compound that surrounds the conductor blank, this jacket also being machined during machining of the end face of the composite part before mounting of the annular carbon disk. In this way, firm bonding of the molding compound to the annular carbon disk at its outside circumference can be achieved when the annular carbon ring is adhesively bonded to the composite part. This is particularly advantageous with regard to the mechanical strength and thus to the useful life of the commutator. Another benefit is that such bonding of the annular carbon disk at its outside circumference to the molding compound of the hub body in the finished commutator prevents aggressive substances from penetrating radially from the outside into the region of the contact surfaces that exist between the carbon segments and the conductor segments. In particular, in combination with the radially inner bonding of the carbon segments to a fixation ridge as explained hereinabove, the contact surfaces are hermetically encapsulated and thus sealed on all sides.

In a particularly preferred embodiment, the conductor blank used in the scope of the present invention is provided on its end face to be machined with an inner annular ridge, an outer annular ridge and radial ridges, these ridges being raised relative to the rest of the end face, and so pocket-like depressions are formed between the ridges. The number of these radial ridges corresponds to the number of radial grooves disposed on the opposite side, which in turn is identical to the number of carbon segments and of conductor segments. The roots of these radial grooves can run in substantially the same plane as the end face between the ridges. A conductor blank structured in this way is characterized by several advantages, that heretofore have not been achieved in this combination, since the conductor blank has particularly high torsional stiffness despite the relatively economical use of material, while at the same time the amount of material that must be removed during machining of the end face of the composite part is relatively small. Thus a conductor blank formed with this geometry can be produced particularly inexpensively, coated with molding compound while the hub body is being molded on to achieve a particularly precise composite part and, as a piece of the composite part, can be machined particularly economically on the end face. Thus, if the roots of the radial grooves run in substantially the same plane as the end face between the ridges, substantially only the inner annular ridge, the outer annular ridge and the radial ridges need to be removed, for example by turning with the lathe, during machining of the end face of the composite part, since, with the cited dimensions, the radial grooves are opened upon complete removal of the said ridges. The improvement of the conductor blank explained in the foregoing can obviously be employed with the same advantages even for such flat commutators of the class in question in which the annular carbon disk is not adhesively bonded to the composite part but instead is secured in some other way, such as by soldering. The option to divide the present patent application in order to further prosecute the geometry of the conductor blank separately is reserved.

Although—as specified and explained in the foregoing—the present invention can be used especially within the scope of a method for producing flat commutators in which the end face of the composite part of conductor blank and hub body is machined by chip-removing techniques until the grooves filled with molding compound are opened, in order to subdivide the conductor blank into the conductor segments, it is in no way limited to performing the method in this way. In an alternative production method, which is also covered by the present invention, the end face of the composite part is indeed machined, but without thereby opening the grooves filled with molding compound; instead, when the method is performed in this way, the conductor segments remain joined to one another even after machining of the end face of the composite part, specifically by thin connecting ridges in the region of the groove roots. Cuts through these connecting ridges are made only after the annular carbon disk has been adhesively bonded to the composite part, preferably in one working step together with subdivision of the annular carbon disk into carbon segments.

Two preferred practical examples of the present invention will be explained in more detail hereinafter with reference to the drawing, wherein

DETAILED DESCRIPTION OF THE PREFERRED EMBODIMENTS

Figure 1:
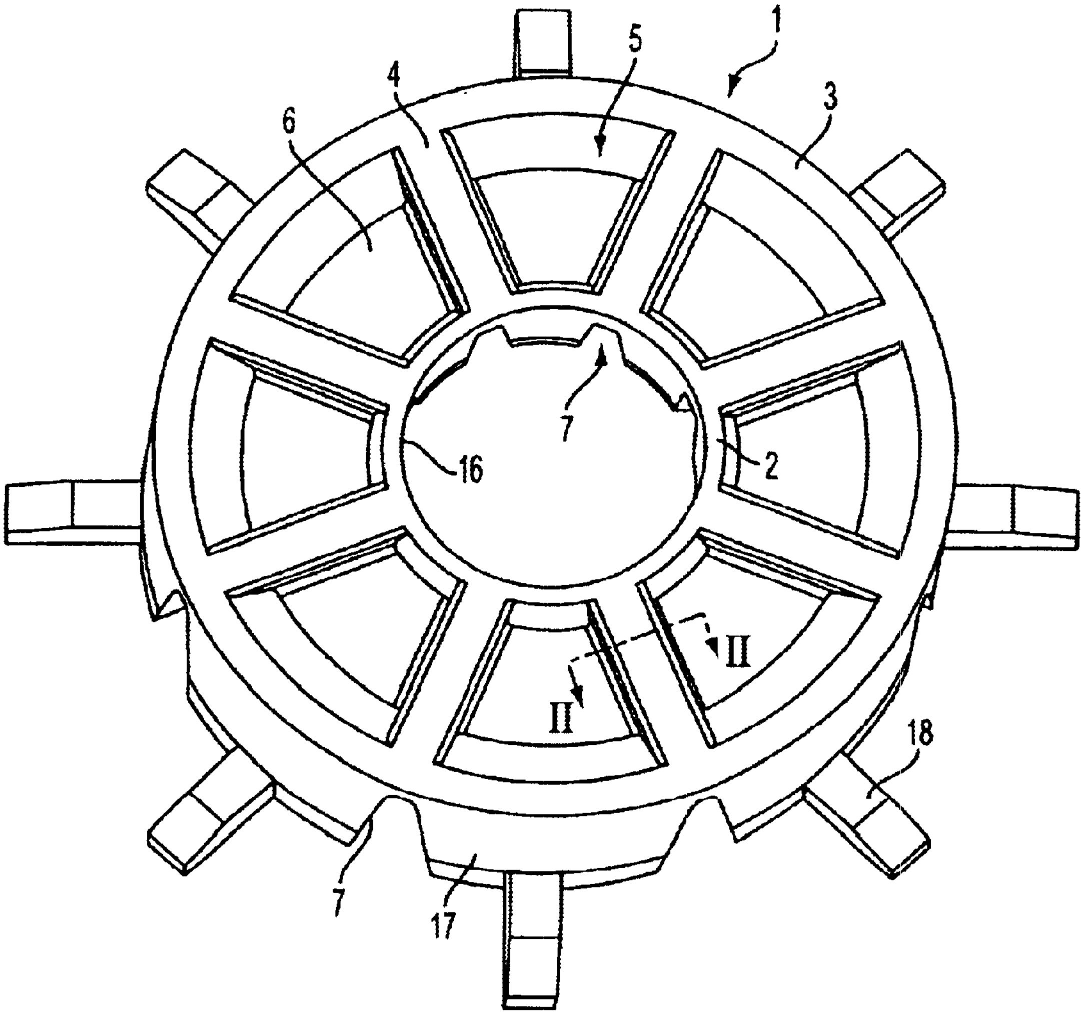
FIG. 1 shows a perspective view of a conductor blank.
Figure 2:
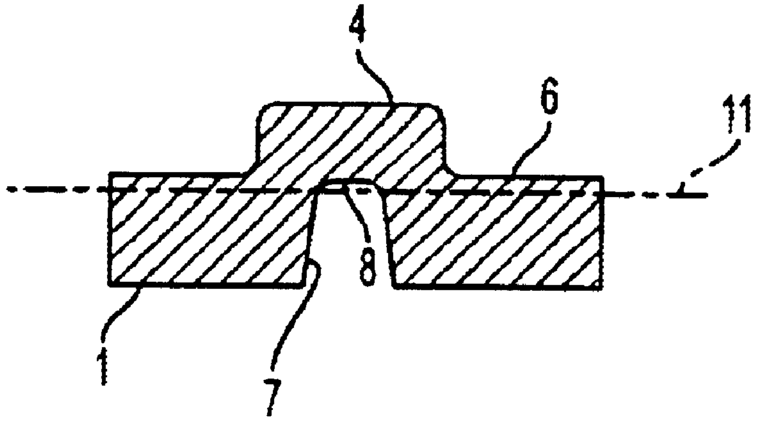
FIG. 2 shows a tangential section through the conductor blank of FIG. 1 along line II—II.

Conductor blank 1 illustrated in FIGS. 1 and 2 has substantially pot-shaped geometry. In its basic structure it therefore corresponds to the prior art, as can be inferred from WO 97/03486, for example. Compared with known conductor blanks as disclosed by that patent, for example, the conductor blank according to FIGS. 1 and 2 features an inner annular ridge 2, an outer annular ridge 3 and eight radial ridges 4 on that end face to which the annular carbon disk will subsequently be adhesively bonded. A pocket-like depression 5 is formed between each two neighboring radial ridges 4 and the portions of inner annular ridge 2 and outer annular ridge 3 connecting them. The end face formed between the ridges by the bottom 6 of the pocket-shaped depressions 5 is disposed in a plane normal to the axis. Radial grooves 7 formed on the opposite side of conductor blank 1 have trapezoidal cross section. They run parallel to radial ridges 4 and have a depth such that their groove root 8 is disposed in substantially the same plane as bottom 6 of pocket-shaped depressions 5.

Figure 4:
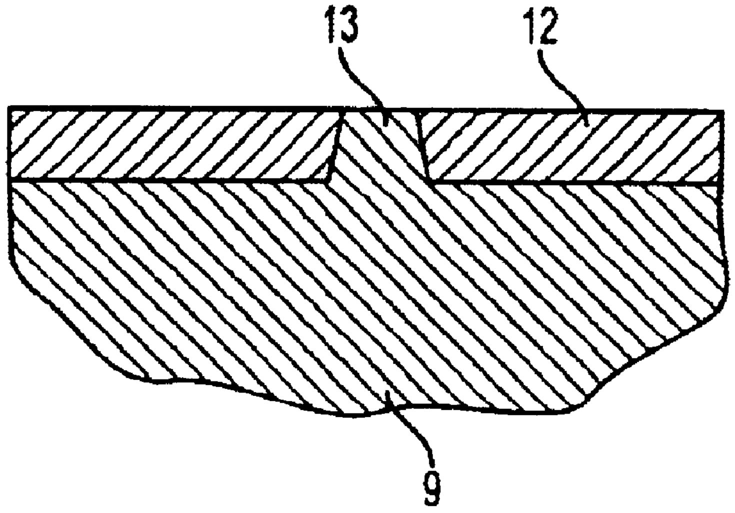
FIG. 4 shows a tangential section through the composite part illustrated in FIG. 3 along line IV—IV.
Figure 3:
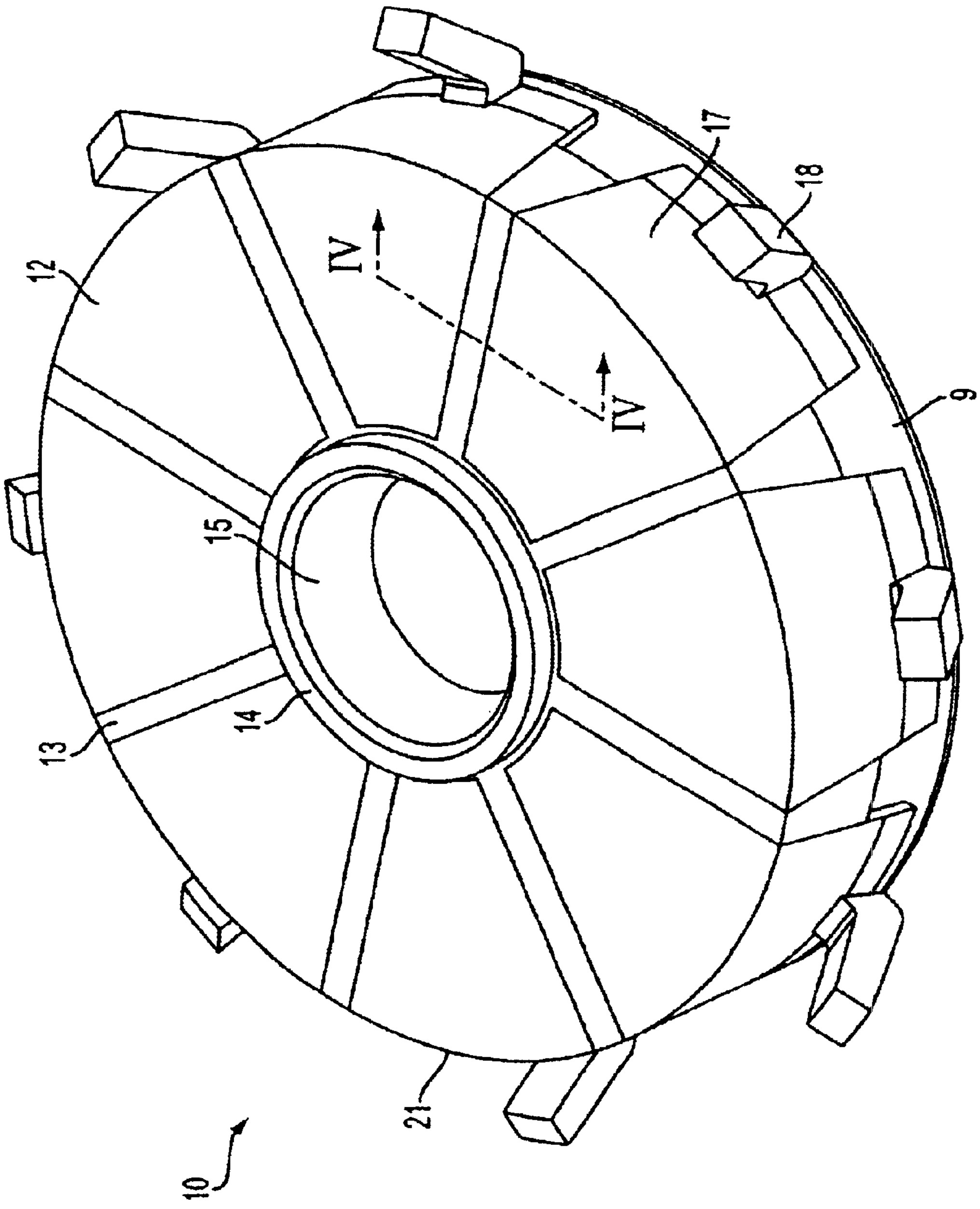
FIG. 3 shows the composite part formed from conductor blank and hub body after machining of its end face to subdivide the conductor blank into eight conductor segments.

FIGS. 3 and 4 illustrate composite part 10 comprising the conductor blank according to FIGS. 1 and 2 as well as the compression-molded part molded thereon and forming hub body 9, after its end face, namely the end face shown in FIG. 1, has been machined. The previously performed step of molding on the hub body made of molding compound corresponds to the prior art, as disclosed in WO 97/03486, for example, and so no explanations are required here. Machining of the end face of composite part 10 involves turning the end face with the lathe to remove inner annular ridge 2, outer annular ridge 3 and radial ridges 4. After removal of the ridges, the conductor blank has a closed, annular, flat end face in the plane formed by bottom 6 of pocket-shaped depressions 5. Thereafter this annular face is further turned with the lathe to the point that grooves 7 are completely opened in the region of their roots 8. The location of this machining plane 11 is illustrated in FIG. 2. Obviously minimal removal of material from the closed, annular, flat end face of the conductor blank is sufficient in order to open grooves 8 filled with molding compound. If grooves 7 were even deeper than illustrated in FIG. 2, it would even be possible to open the radial grooves while inner annular ridge 2, outer annular ridge 3 and radial ridges 4 were still being worked off.

By virtue of the opening of grooves 7 by machining the end face of composite part 10, the conductor blank illustrated in FIGS. 1 and 2 is subdivided into eight separate conductor segments 12. A rib 13, formed from molding compound, of hub body 9 is disposed between each two conductor segments 12.

During machining of the end face of composite part 10, an inner annular region was hollowed out, thus leaving an annular inner fixation ridge 14 of molding compound standing. In this connection, it is important that hub body 9 formed from molding compound surrounds an inner sleeve 15, which is disposed radially inside central bore 16 of conductor blank 1. In this way the entire radial extent of the end face of conductor blank 1 can be machined, and at the same time fixation ridge 14 can be left standing radially inside central bore 16 of conductor blank 1.

FIG. 3 further illustrates how hooked elements 18 molded onto wall portions 17 of conductor segments 12 have been bent out of their radially protruding position illustrated in FIG. 1.

Figure 5:
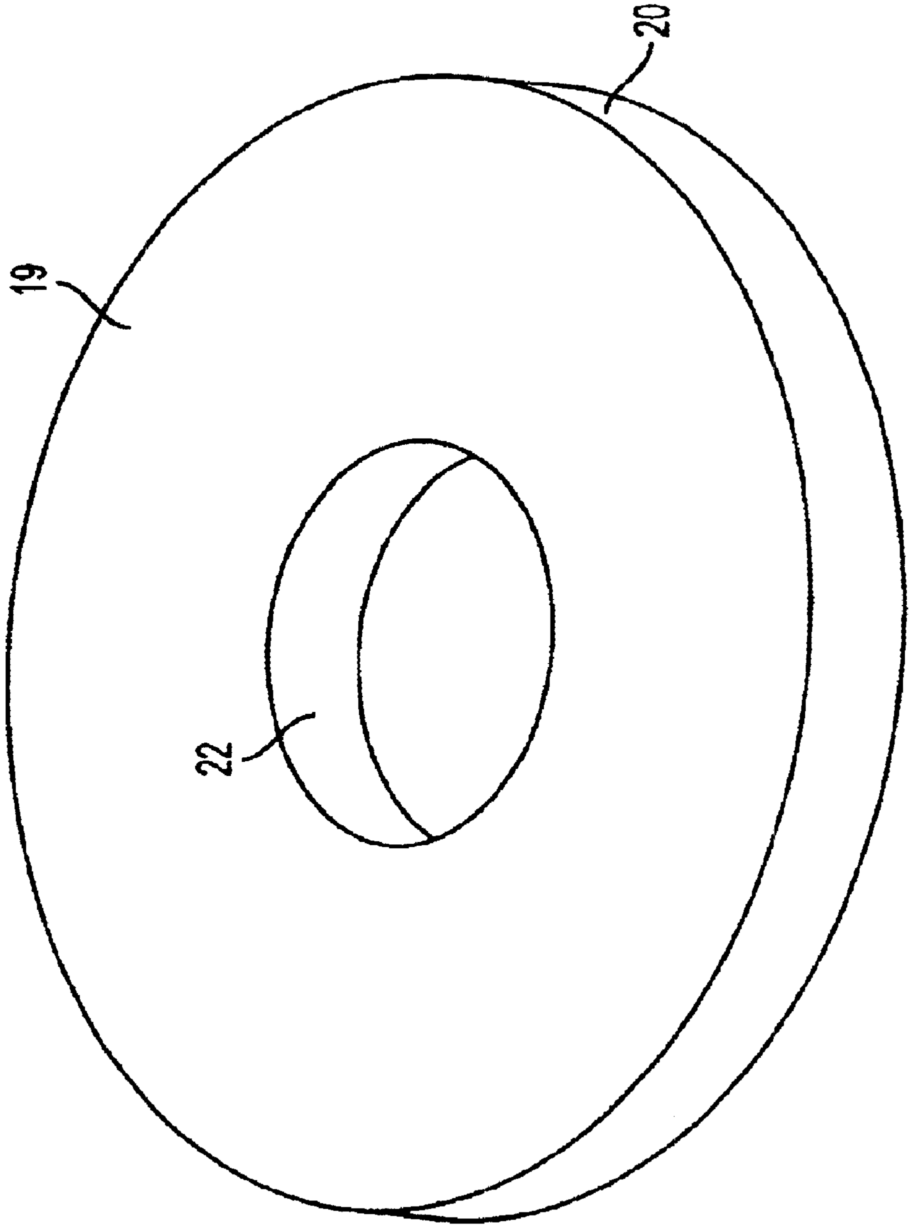
FIG. 5 shows a perspective view of the annular carbon disk before it is adhesively bonded to the composite part of FIG. 3.

FIG. 5 is provided merely to illustrate that there is used an annular carbon disk 19 that can be produced inexpensively and relatively simply for production of the subsequent carbon segments. Outside circumference 20 of annular carbon disk 19 is matched exactly to outside circumference 21 of composite part 10 machined at its front face, such that the outside diameter of annular carbon disk 19 coincides with the outside diameter of composite part 10 in the region of machining plane 11. The diameter of bore 22 of annular carbon disk 19 is about 0.1 mm smaller than the outside diameter of fixation ridge 14 of composite part 10. This is helpful in ensuring that carbon ring 14 is seated securely in position during the production process even before the adhesive bond with composite part 10 is made and that adhesive present between the parts to be adhesively bonded together cannot escape.

Figure 6:
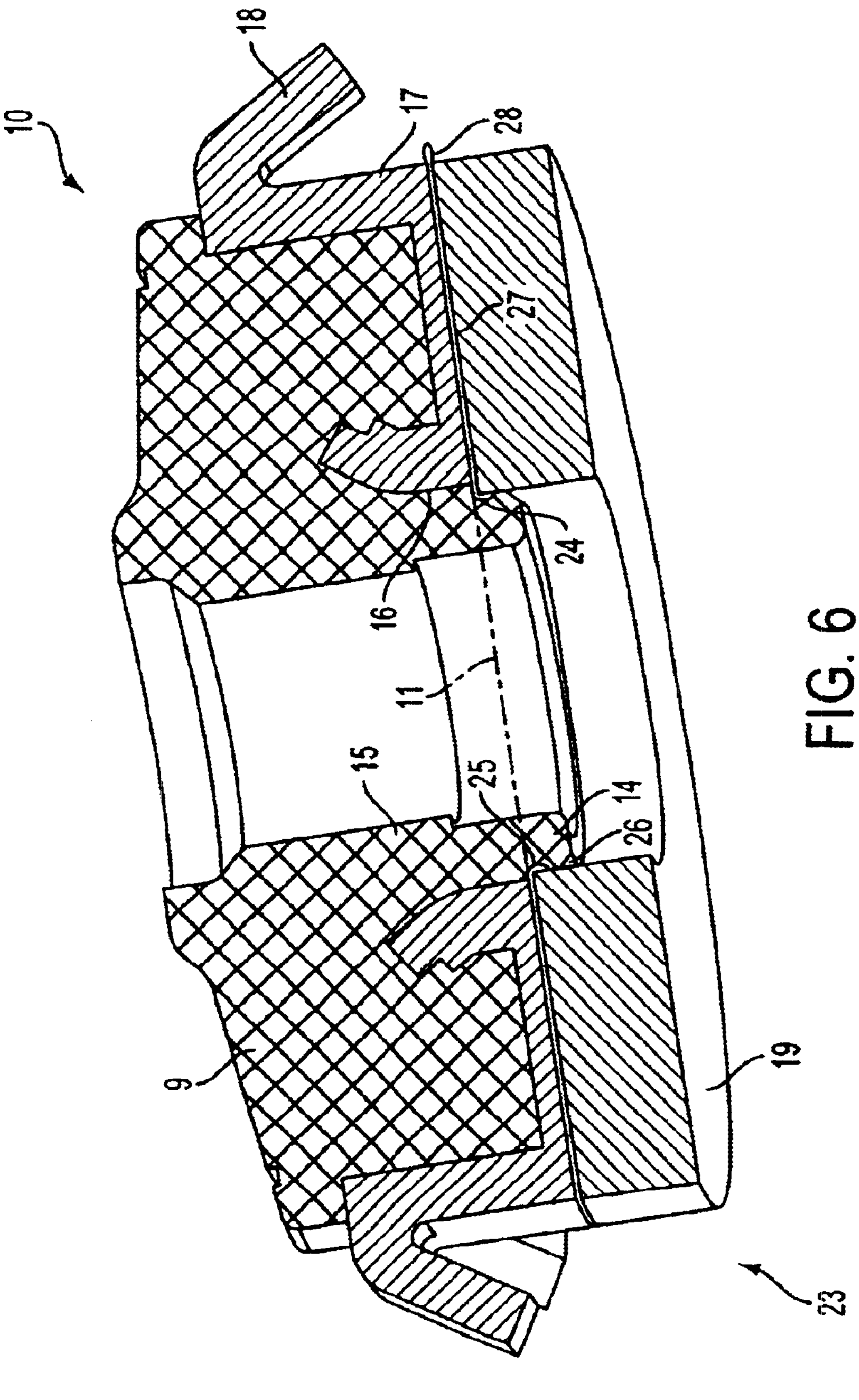
FIG. 6 shows a perspective cutaway view of a commutator blank produced by adhesively bonding the annular carbon ring of FIG. 5 onto the composite part of FIG. 3.

Two special details of fixation ridge 14 can be clearly seen in FIG. 6, which shows commutator blank 23 formed from composite part 10 and adhesively bonded annular carbon disk 19. Firstly, outside face 24 of fixation ridge 14 tapers from the region of maximum diameter toward machining plane 11; in other words, the outside diameter of fixation ridge 14 decreases from the region of a maximum diameter toward machining plane 11. In this way a circumferential depression in the form of an annular groove is formed at the outside circumference of fixation ridge 14, to become filled with adhesive during adhesive bonding of annular carbon disk 19 to composite part 10. Adhesive pocket 25 with approximately wedge-shaped cross section formed in this way favors mechanically strong and tight bonding of annular carbon disk 19 and of the carbon segments produced therefrom with composite part 10. The second obvious detail is chamfer 26 of fixation ridge 14, which is important with regard to the oversize of the fixation ridge relative to bore 22 of annular carbon disk 19, in order to rule out damage to the annular carbon disk during assembly.

As explained in detail hereinabove, annular carbon disk 19 is adhesively bonded to composite part 10. A mixture of thermoplastic plastic powder (PPS) and thermosetting plastic powder is used as the adhesive. PPS has excellent thermal stability and good resistance to motor fuels. One of the two bonded faces is dusted with the adhesive powder blend as well as with metal powder. Copper powder coated with silver for corrosion reasons and having a particle-size range of 40 to 90 $\mu$m is used as the metal powder, whose function is to ensure adequate conductivity. The proportion of metal powder in the adhesive filled therewith ranges between 25% and 50%. Just enough plastic powder is sprinkled on the bonded face to ensure that the surface is covered uniformly and densely. Composite part 10 and annular carbon disk 19 are then brought together and heated to about 300° C. under a pressure of about 5 N/mm$^2$. As a result, the adhesive melts and penetrates into the pores of annular carbon disk 19. After a short holding time of about 5 seconds, the assembly is cooled. As a result, the adhesive that has penetrated into the pores solidifies, thus creating a mechanical interlocking relationship. Thereby, optimal adhesion, superior to that of a soldered joint, is achieved. The metal powder forms the contact bridges between conductor segments 12 and annular carbon disk 19, thus achieving very low contact resistance. The thickness of adhesive layer 27 is at most 500 $\mu$m in the final condition, the plastic having penetrated partly into the pores of annular carbon disk 19 and solidified therein, as explained hereinabove.

Because the conductive particles were interspersed throughout the mass of plastic, the particles responsible for electrical conduction are embedded in the adhesive and consequently are protected from electrical and chemical reactions with the surrounding medium. Furthermore, because annular carbon disk 19 is adhesively bonded with molding compound, in the region of fixation ridge 14 on the radially inner side, and in the region of ribs 13 in the circumferential direction, the contact-face region associated with each individual conductor segment 12 is sealed against ingress of aggressive media. If the outside circumference of composite part 10 were to be surrounded in the region of wall portions 17 by an annular jacket formed from molding compound, corresponding bonding of the annular carbon disk and of the subsequent carbon segments to the molding compound on the radially outer side would also be possible in the region of the outside circumference, in order to prevent ingress of aggressive substances in the region of the contact faces in this region also.

Figure 7:
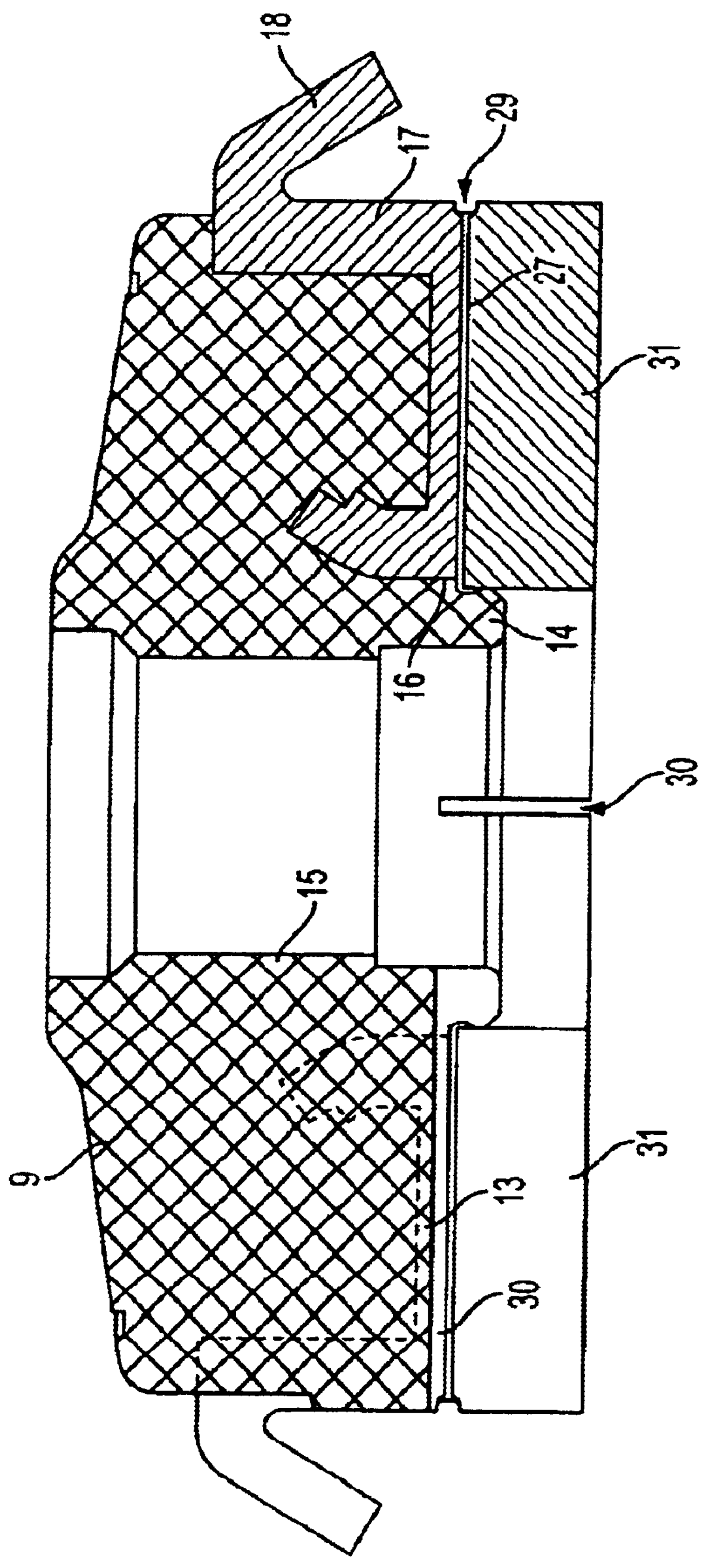
FIG. 7 shows an axial section through the commutator blank of FIG. 6, after a circumferential groove has been turned with the lathe at the outside circumference in the region of the adhesive layer.

In order to remove adhesive residues 28 emerging at the outside circumference of commutator blank 23 as a result of swelling, a circumferential groove 29 such as illustrated in FIG. 7 is turned with the lathe in the region of adhesive layer 27 after the adhesive has solidified. In this way commutator blank 23 has been prepared to the point that the only remaining step is to subdivide annular carbon disk 19 into carbon segments 31 by separating cuts 30. The left half of FIG. 7 shows that separating cut 30 extends into molding-compound rib 13. Thus fixation ridge 14 is also subdivided by separating cuts 30, with the result, in particular, that flow of current between the individual conductor segments via the adhesive filled with metal particles is ruled out.

Figure 8:
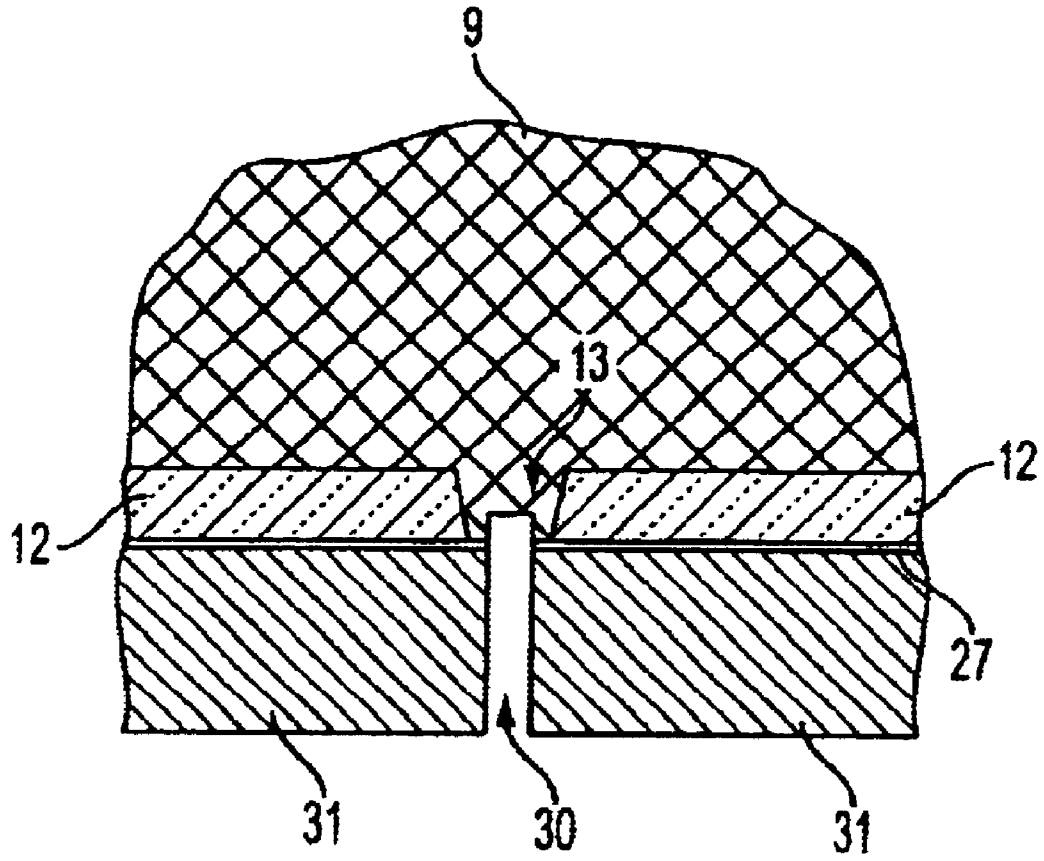
FIG. 8 shows a tangential section through a flat commutator formed from the commutator blank of FIG. 7 by making separating cuts that subdivide the annular carbon disk into carbon segments.

FIG. 8 shows a tangential section through the region between two conductor segments 12 and the carbon segments 31 associated therewith. Once again it is evident that separating cut 30, which subdivides the annular carbon disk into the two carbon segments 31 illustrated here, extends into molding-compound rib 13 of hub body 9 and thus also cuts through adhesive layer 27. It is further evident that the width of separating cut 30 is smaller than the width of molding-compound rib 13. In this way, while directly adjoining separating cut 30, each of the two carbon segments 31 is bonded firmly to molding-compound rib 13 of hub body 9, thus effectively preventing bursting of carbon segments 31 at their base while separating cuts 30 are being made.

FIGS. 9 to 13 illustrate an alternative to the production method explained in the foregoing. To a considerable extent they correspond to FIGS. 2, 3, 4, 7 and 8; as regards the scope of agreement with those figures, the foregoing explanations are equally applicable. The description hereinafter is therefore confined to the major differences of the production method illustrated in FIGS. 9 to 13 compared with the production method according to FIGS. 1 to 8.

Figure 9:
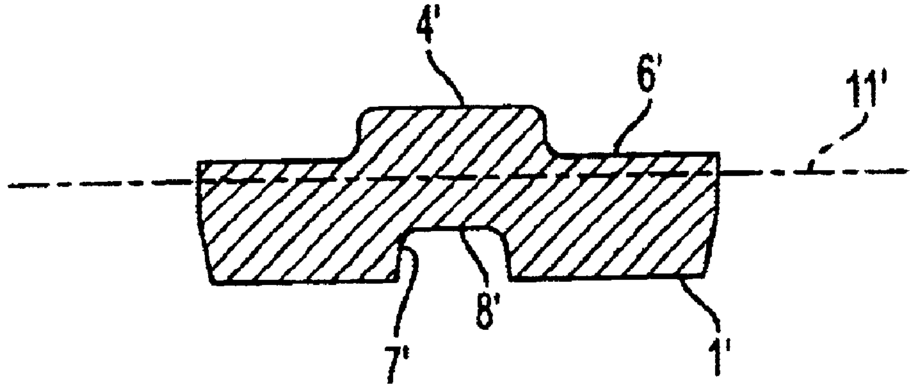
FIG. 9 to FIG. 13 show an alternative version of the production method illustrated in FIGS. 1 to 8 and explained hereinafter with reference thereto.
Figure 11:
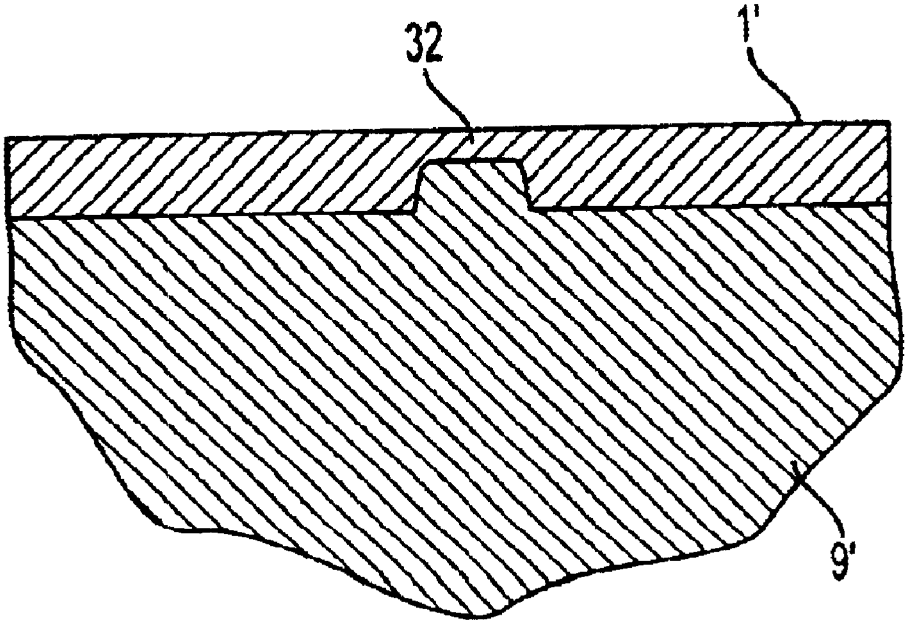
Figure 10:
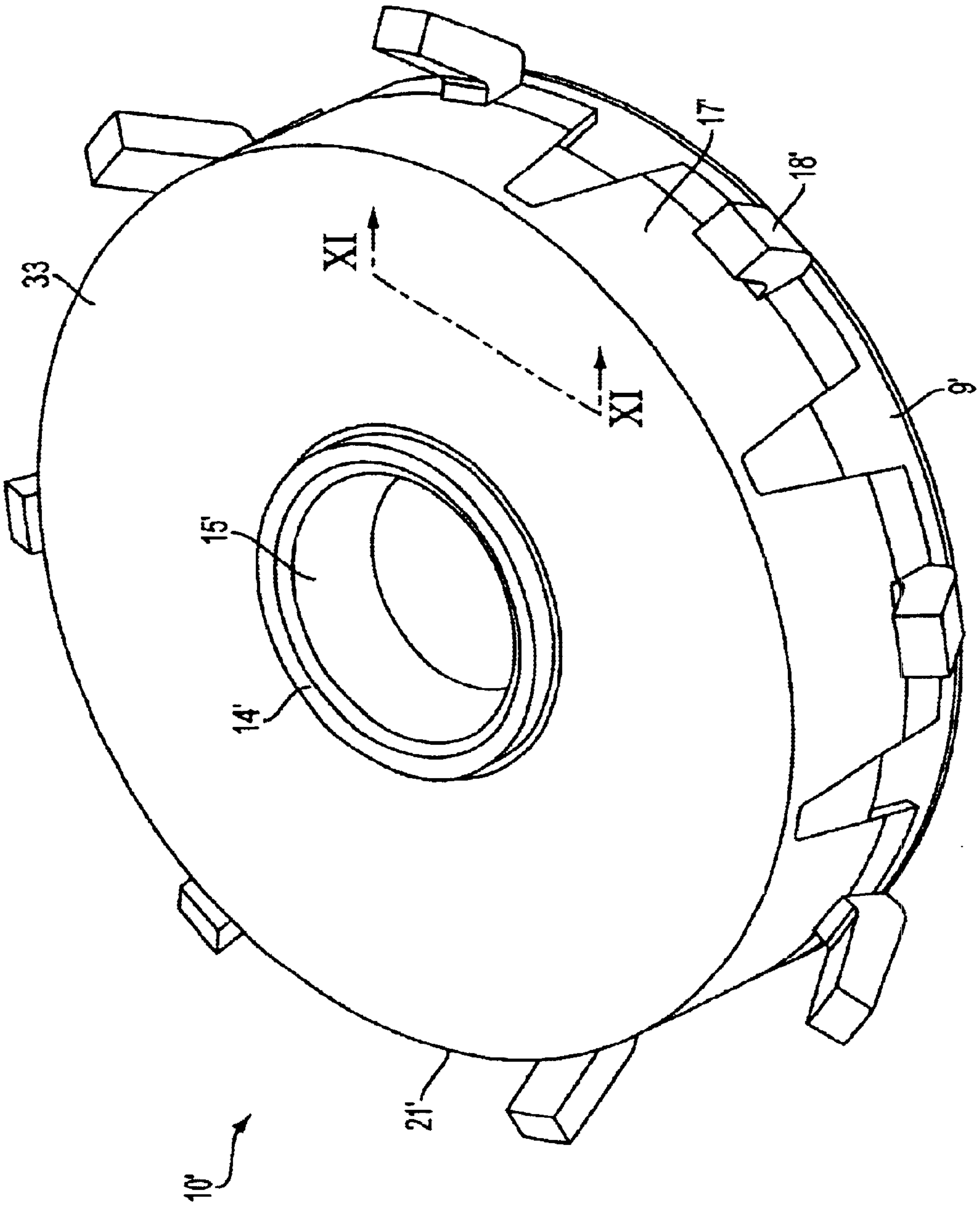
Figure 12:
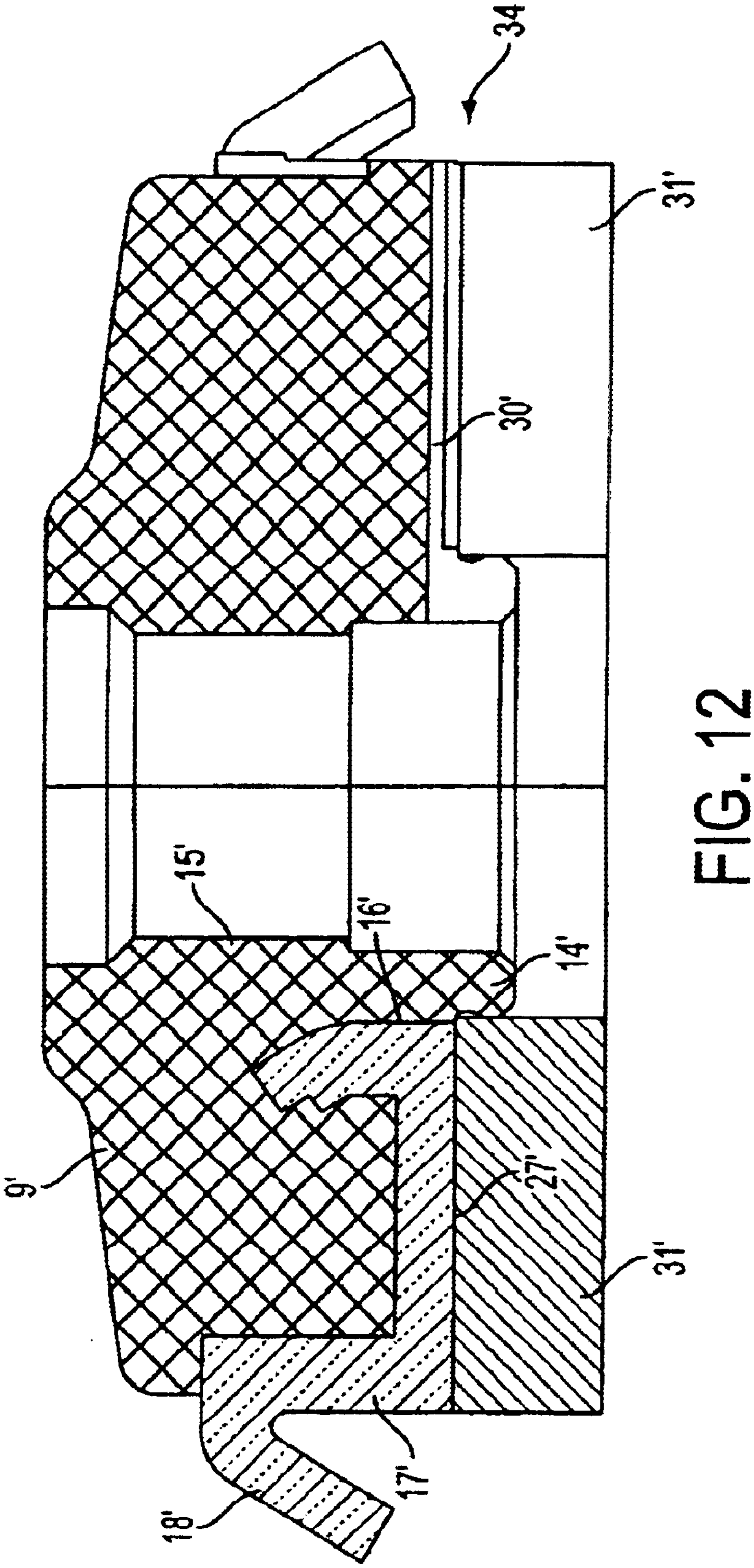
Figure 13:
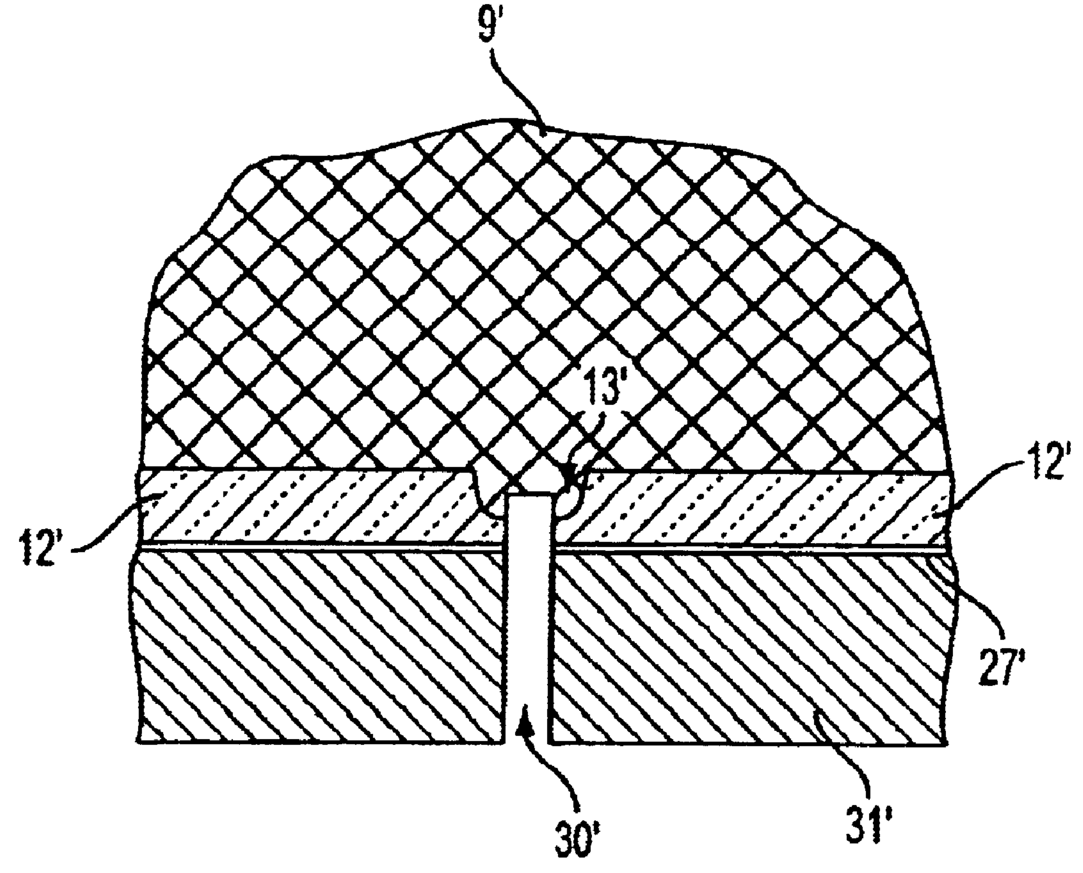

Comparison of FIGS. 9 and 2 reveals that radial grooves 7' in the alternative version described here have shallower depth than radial grooves 7 of the production method explained hereinabove. It therefore follows that, while the end face of composite part 10' comprising the conductor blank and the hub body is being machined down to machining plane 11, grooves 7' are not opened. Instead, the subsequent conductor segments of the conductor blank remain joined to one another via connecting ridges 32. A preferred value for the thickness of connecting ridges 32 in a flat commutator of typical dimensions is about 0.3 mm.

The annular carbon disk is therefore adhesively bonded onto annular face 33 of conductor blank 1' formed by machining of the end face. Subdivision of conductor blank 1' into conductor segments 12' takes place in one working step together with subdivision of the annular carbon disk into carbon segments 31' by separating cuts 30', which extend into the molding compound of the hub body in grooves 7'.

Another way in which the method illustrated in FIGS. 9 to 13 differs from the procedure described hereinabove is that a circumferential groove is not made with the lathe in the region of the adhesive layer between the end face of the conductor blank and the annular carbon disk; instead, the entire annular carbon disk is turned by a slight additional amount with the lathe at its radially outside circumference, with the result that the annular carbon disk then has a slightly smaller diameter than the conductor blank. This circumferential machining of the annular carbon disk of the commutator blank extends to the level of connecting ridges 32 between subsequent conductor segments 12', and so adhesive residues that may have been squeezed out of the joint plane can be removed. The region of circumferential machining of the commutator blank is indicated schematically in FIG. 12 by a step 34 on the outside circumference.

What is claimed is:

1. A method for producing a flat commutator comprising the steps of:

forming a hub body from insulating molding compound, molding said hub body onto a conductor blank provided with radial grooves and filling said radial grooves with molding compound to form a composite part defined by said hub body and conductor blank, machining said composite pan by chip-removing tools on an end face of the conductor blank turned away from the hub body such that an annular inner fixation ridge made of molding compound remains on an end face of said composite part, said annular inner fixation ridge having a tapered outer edge that decreases in a machining direction, adhesively bonding an annular carbon disk on the machined end face of the composite part to form a commutator blank, subdividing said annular carbon disk into carbon segments by cutting into said molding compound that fills the radial grooves, and subdividing said conductor blank into conductor segments, whereby electrically conductive connections are established between said annular carbon disk and said conductor segments.

2. A method in accordance with claim 1, wherein said subdividing of said conductor blank occurs by opening the radial grooves filled with molding compound during the machining of the end face of said conductor blank.

3. A method in accordance with claim 1, wherein said subdividing of said conductor blank occurs by cutting said conductor blank.

4. A method in accordance with claim 1, wherein the outer edge of the annular inner fixation ridge is chamfered at an angle of between 10° and 45°.

5. A method in accordance with claim 1, further comprising the steps of machining an inner annular ridge, an outer annular ridge and radial ridges on an end face of said conductor blank, said ridges being raised relative to the rest of the end face of said conductor blank to form pocket-like depressions between said ridges.

6. A method in accordance with claim 5, wherein said radial grooves in said conductor blank further comprise roots that run substantially in the same plane as the end face of the conductor blank between said ridges.

7. A method in accordance with claim 1, wherein said adhesive bonding of said annular carbon disk with said composite part comprises the steps of:

sprinkling, at least one of said annular carbon disk and said composite part with thermoplastic and/or thermosetting plastic powder and metal powder, simultaneously pressing together said annular carbon disk with said composite part, and heating said pressed-together annular carbon disk and said composite part.

8. A method in accordance with claim 7, wherein in the mixture of thermoplastic and/or thermosetting plastic powders, the melting point of the thermoplastic powder is at least 290°C.

9. A method in accordance with claim 1, wherein said adhesive bonding of said annular carbon disk with said composite part comprises the step of applying an adhesive filled with an electrically conductive metallic or nonmetallic filler on at least one of said annular carbon disk and said composite part before said annular carbon disk and said composite part are joined together.

10. A method in accordance with claim 9, wherein content of the filler is between 5% and 95% relative to the mass of the filled adhesive.

11. A method in accordance with claim 10, wherein content of the filler is between 25% and 50% relative to the mass of the filled adhesive.

12. A method in accordance with claim 10 or 11, wherein metal powder with particle sizes of between 40 and 90 $\mu$m is used as the filler.

13. A method in accordance with claim 1, further comprising, after the adhesive bonding step, the step of forming a circumferential groove in said commutator blank in a joint plane between said composite part and said annular carbon disk.

14. A method in accordance with claim 1, wherein after the adhesive bonding step, said annular carbon disk and an adjoining part of said conductor blank are turned down with a lathe at an outside circumference.

15. A method in accordance with claim 1, wherein said conductor blank has a substantially pot-shaped geometry and said conductor segments are joined to one another over their entire radial extent.

16. A method in accordance with claim 1, wherein said conductor blank further comprises axially projecting retaining catches disposed spaced apart on its inner circumferential rim.

17. A method in accordance with claim 1, wherein said conductor blank further comprises axially projecting wall portions, each having a contact lug, disposed spaced apart on its outer circumferential rim.

18. A flat commutator comprising:

a body formed from insulating molding compound, a plurality of conductor segments adhesively bonded to an equal number of carbon segments having radial inner faces, and an inner fixation ridge having an outside diameter and provided on said hub body and against which said radial inner faces of said carbon segments bear, wherein said outside diameter of said inner fixation ridge decreases toward said conductor segments.

19. A flat commutator in accordance with claim 18, wherein the carbon segments further comprise rims defined by radial air gaps separating each two carbon segments, wherein the hub body further comprises molding-compound ribs, and wherein the carbon segments are adhesively bonded in the region of their rims to the molding-compound rims provided on the hub body.

* * * * *

UNITED STATES PATENT AND TRADEMARK OFFICE

CERTIFICATE OF CORRECTION

PATENT NO. : 6,684,485 B1 
DATED : February 3, 2004
INVENTOR(S) : J. Potocnik

It is certified that error appears in the above-identified patent and that said Letters Patent is hereby corrected as shown below:

Tile page,
Item [22], PCT Filing Date, should read -- May 31, 2000 --

Signed and Sealed this

Twenty-second Day of June, 2004

JON W. DUDAS
*Acting Director of the United States Patent and Trademark Office*